US010431110B2

(12) United States Patent
Carney et al.

(10) Patent No.: US 10,431,110 B2
(45) Date of Patent: *Oct. 1, 2019

(54) COMPUTERIZED SYSTEM AND METHOD FOR ENABLING A REAL-TIME SHARED WORKSPACE FOR COLLABORATION IN EXPLORING STEM SUBJECT MATTER

(71) Applicant: Fluidity Software, Inc., Somerville, MA (US)

(72) Inventors: Donald P. Carney, Somerville, MA (US); Andrew Forsberg, Leominster, MA (US)

(73) Assignee: Fluidity Software, Inc., Somerville, MA (US)

( * ) Notice: Subject to any disclaimer, the term of this patent is extended or adjusted under 35 U.S.C. 154(b) by 91 days.

This patent is subject to a terminal disclaimer.

(21) Appl. No.: 15/353,827

(22) Filed: Nov. 17, 2016

(65) Prior Publication Data

US 2017/0147277 A1 May 25, 2017

Related U.S. Application Data

(60) Provisional application No. 62/257,766, filed on Nov. 20, 2015.

(51) Int. Cl.
*G09B 5/14* (2006.01)
*G06F 3/14* (2006.01)
(Continued)

(52) U.S. Cl.
CPC .......... *G09B 5/14* (2013.01); *G06F 3/04845* (2013.01); *G06F 3/04883* (2013.01); *G06F 3/1454* (2013.01); *G06F 3/1462* (2013.01); *G06T 11/206* (2013.01); *G09B 7/04* (2013.01); *G09B 19/00* (2013.01); *G09B 19/0069* (2013.01); *G09B 19/025* (2013.01);
(Continued)

(58) Field of Classification Search
None
See application file for complete search history.

(56) References Cited

U.S. PATENT DOCUMENTS 5,176,520 A    1/1993   Hamilton ................ 434/350
6,760,748 B1    7/2004   Hakim .................... 709/204
(Continued)

*Primary Examiner* — Jason T Yen
(74) *Attorney, Agent, or Firm* — Bodner & O'Rourke, LLP; Gerald T. Bodner; Christian P. Bodner

(57) ABSTRACT

A computerized system enables teachers and students to collaborate in the solutions of STEM problems. The system includes a communications network linking a plurality of computers, at least one teacher computer operable by a respective teacher, at least one student computer operable by a respective student, and at least one computer-readable storage medium. Each of the computers includes an input device and a touch sensitive screen for receiving handwritten input via the input device. The computers are operatively linked and each of their touch sensitive screens forms a virtual shared whiteboard defining a common work page upon which input from each computer is received and displayed. Input received from each computer interacts mathematically with input received from each other computer in the network and the interactions are displayed on each screen. The input and interactions form a collaborative solution to a STEM problem.

26 Claims, 9 Drawing Sheets

(51) Int. Cl.
*G06F 3/0488* (2013.01)
*G09B 7/04* (2006.01)
*G09B 19/00* (2006.01)
*G09B 19/02* (2006.01)
*G06F 3/0484* (2013.01)
*G06T 11/20* (2006.01)
*H04L 29/06* (2006.01)

(52) U.S. Cl.
CPC ..... *H04L 65/4015* (2013.01); *G09G 2370/02* (2013.01); *G09G 2380/14* (2013.01)

(56) References Cited

U.S. PATENT DOCUMENTS

| | | | |
|---|---|---|---|
| 7,213,211 B1 | 5/2007 | Sanders et al. | 715/753 |
| 7,466,958 B2 | 12/2008 | Dunk et al. | 434/362 |
| 7,752,148 B2 | 7/2010 | Yu et al. | 706/12 |
| 2004/0157203 A1 | 8/2004 | Dunk et al. | 434/350 |
| 2004/0191746 A1* | 9/2004 | Maron | G09B 7/02 434/323 |
| 2004/0267607 A1 | 12/2004 | Maddux | 705/7.42 |
| 2006/0001656 A1* | 1/2006 | LaViola, Jr. | G06F 3/04883 345/179 |
| 2006/0024649 A1 | 2/2006 | Vernon | 434/201 |
| 2008/0108035 A1* | 5/2008 | Warda | G09B 7/02 434/335 |
| 2009/0018979 A1 | 1/2009 | Yu et al. | 706/12 |
| 2010/0225602 A1 | 9/2010 | Fujimura | 345/173 |
| 2010/0279266 A1* | 11/2010 | Laine | G06Q 10/10 434/350 |
| 2011/0159465 A1 | 6/2011 | Gutridge | 434/154 |
| 2011/0225494 A1* | 9/2011 | Shmuylovich | G06F 3/04883 715/705 |
| 2011/0234516 A1 | 9/2011 | Nakajima et al. | 345/173 |
| 2011/0244434 A1 | 10/2011 | Livne et al. | 434/188 |
| 2011/0257973 A1* | 10/2011 | Chutorash | G01C 21/3661 704/235 |
| 2011/0307535 A1* | 12/2011 | Vukosavljevic | G06F 3/04883 708/142 |
| 2012/0254773 A1* | 10/2012 | Viswanathan | G06F 3/0483 715/753 |
| 2013/0067531 A1* | 3/2013 | Morris | G06F 21/54 726/1 |
| 2013/0164726 A1 | 6/2013 | Michalowski et al. | 434/362 |
| 2013/0244218 A1 | 9/2013 | Cook et al. | 434/350 |
| 2015/0269859 A1 | 9/2015 | Michalowski et al. | 434/362 |
| 2015/0339051 A1* | 11/2015 | Yang | G06F 3/04883 382/189 |

* cited by examiner

COMPUTERIZED SYSTEM AND METHOD FOR ENABLING A REAL-TIME SHARED WORKSPACE FOR COLLABORATION IN EXPLORING STEM SUBJECT MATTER

CROSS-REFERENCE TO RELATED APPLICATIONS

This application is related to U.S. Provisional Patent Application Ser. No. 62/257,766, filed on Nov. 20, 2015, and entitled "COMPUTERIZED SYSTEM AND METHOD FOR ENABLING A REAL-TIME SHARED WORKSPACE FOR COLLABORATION IN EXPLORING STEM SUBJECT MATTER", the disclosure of which is hereby incorporated by reference and on which priority is hereby claimed.

BACKGROUND OF THE INVENTION

Field of the Invention

This invention relates to the collaborative exploration of STEM (Science, Technology, Engineering, and Mathematics) subject matter and more particularly to tools using mobile tablet devices in the collaboration.

Description of Related Art

Currently, various tools or interventions, as they are called in the art, are used to collaborate in the exploration of mathematical and physical concepts. These tools include chalkboard, whiteboard, graphing calculator, personal computers, pen-enabled tablet computers, Interactive Whiteboards (IWB), computational mathematics engines, concept visualization software tools, and the experimental laboratory.

Recently, mobile tablets with touch sensitive screens (for example, iPad™ devices, Android™ devices, Microsoft™ Surface™, and similar devices), because of their low cost, are becoming ubiquitous for use wherein handwritten math notation is an important requirement. For example, entering a math notation such as $x=-b\pm\sqrt{b^2-4ac}/2a$ into a computer is more difficult and time consuming using a keyboard and mouse compared to entering it using the touch sensitive screen of a tablet with a stylus or fingertip, as if using paper and pencil.

The present invention provides a unique system and method for users to participate in a real-time shared workspace collaborative effort in the exploration of STEM concepts using handwritten math notation input on mobile tablet devices.

OBJECTS AND SUMMARY OF THE INVENTION

It is an object of the present invention to provide a computerized system for enabling teachers and students to collaborate in the solutions of STEM problems.

It is another object of the present invention to provide a computerized teaching system which provides a teaching tool for presenting and teaching collaborative solutions to STEM questions.

It is still another object of the present invention to provide a computerized teaching system having at least one teacher computer and at least one student computer in which handwritten inputs on the computers and computer interactions result in a collaborative solution to a STEM problem.

It is a further object of the present invention to provide a computerized system enabling teachers and students to collaborate in the solutions of STEM problems in which the system includes at least one teacher computer and at least one student computer, each of which has a touch sensitive screen, the system having a computer-readable storage medium that contains program instructions that transform each touch sensitive screen into a virtual shared whiteboard that defines a common work page upon which handwritten inputs from each computer are received and displayed.

In accordance with one form of the present invention, a computerized system enabling teachers and students to collaborate in the solution of STEM (Science, Technology, Engineering and Mathematics) problems includes a communications network, at least one teacher computer operable by a respective teacher, at least one student computer operable by a respective student, and at least one computer-readable storage medium. The at least one student computer is operably connected to the at least one teacher computer by the communications network. The at least one computer-readable storage medium is operably connected to the communications network.

Each of the at least one teacher computer and the at least one student computer includes an input device and a touch sensitive screen for receiving handwritten input via the input device. The at least one teacher computer and the at least one student computer are operably connected to the at least one computer-readable storage medium. The at least one computer-readable storage medium contains program instructions that transform each touch sensitive screen of the at least one teacher computer and the at least one student computer operably connected by the communications network into a virtual shared whiteboard. This whiteboard defines a common work page upon which handwritten input from each of the at least one teacher computer and the at least one student computer is received and displayed. The handwritten input received from the at least one teacher computer interacts mathematically with the handwritten input received from the at least one student computer operably connected together by the communications network to generate computer interactions. The computer interactions are displayed on each touch sensitive screen of the at least one teacher computer and the at least one student computer. Thus, the handwritten inputs and computer interactions result in a collaborative solution to a STEM problem.

These and other objects, features and advantages of the present invention will be apparent from the following detailed description of illustrative embodiments thereof, which is to be read in connection with the accompanying drawings.

BRIEF DESCRIPTION OF THE DRAWINGS

The drawings described below illustrate an embodiment of the present invention which exemplifies a teaching intervention wherein the participants and users of the intervention are teachers and students collaborating in a teaching environment via the use of handwritten math notation input on the touch sensitive screens of mobile tablet devices.

FIG. 14 is a simplified pictorial illustration of a GUI display of a teacher's computer of the system of the present invention showing the first step of a teacher-student collaboration in the exploration of a fourth example wherein the teacher and the students collaborate to simplify a math expression using the distributive principle of Algebra.

FIG. 15 is a simplified pictorial illustration of a GUI display showing the second step of the teacher-student collaboration in the exploration of the fourth example wherein the student enters an incorrect equation in answer to the problem presented in FIG. 14.

FIG. 16 is a simplified pictorial illustration of a GUI display showing the third step of the teacher-student collaboration in the exploration of the fourth example wherein the teacher erases an incorrect term in the equation of FIG. 15.

FIG. 17 is a simplified pictorial illustration of a GUI display showing the fourth step of the teacher-student collaboration in the exploration of the fourth example wherein the student is presented with an equation in which to enter a correct term.

FIG. 18 is a simplified pictorial illustration of a GUI display showing the fifth step of the teacher-student collaboration in the exploration of the fourth example wherein the student completes the correction of the equation of FIG. 17.

FIG. 19 is a simplified pictorial illustration of a GUI display showing the sixth step of the teacher-student collaboration in the exploration of the fourth example wherein the student enters the correct answer to the problem presented in FIG. 14.

DETAILED DESCRIPTION OF THE PREFERRED EMBODIMENTS

The following disclosure describes teacher-student collaborations in an education environment as examples of embodiments of the present invention.

Figure 1:
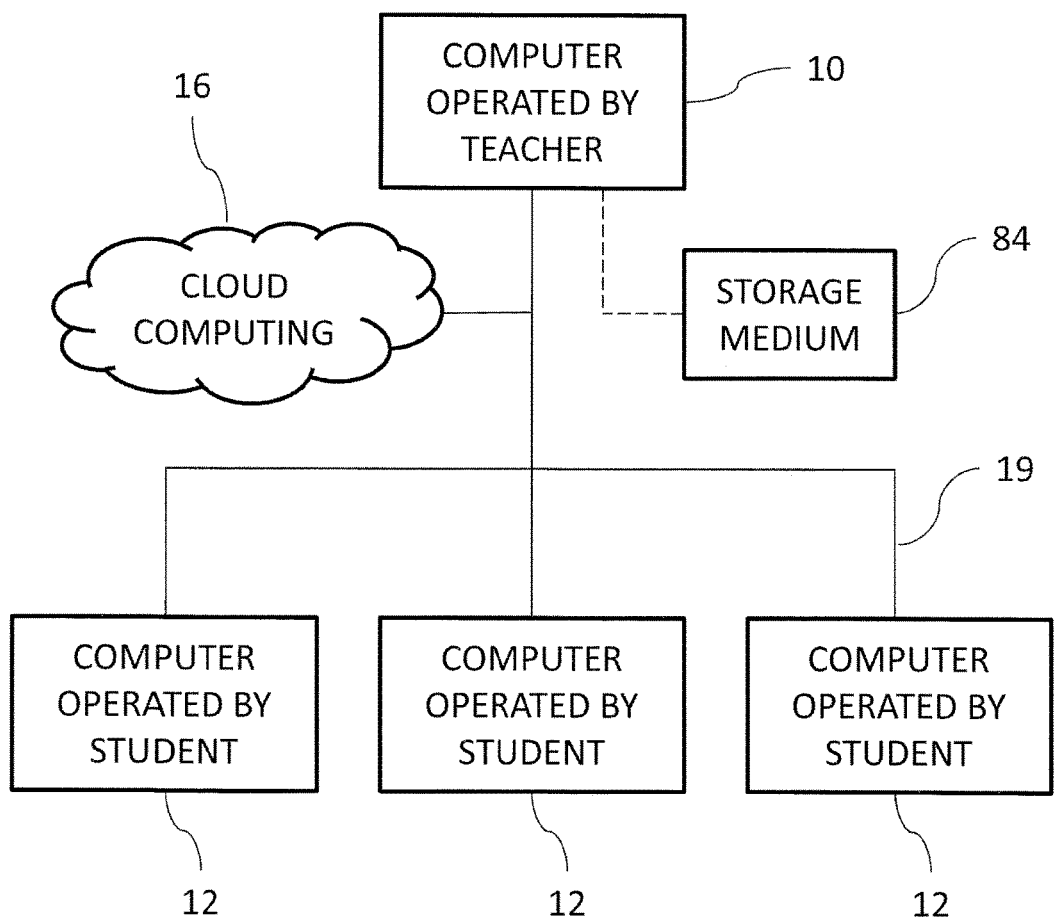
FIG. 1 is a block diagram of a computerized teaching system formed in accordance with the present invention and having a network of computers.

Turning now to the figures, there is shown in FIG. 1 a computerized teaching system formed in accordance with the present invention comprising a network of pen-enabled computers used for the teaching and assessing of STEM subjects. At least one pen-enabled computer 10 operated by a teacher is networked with at least one pen-enabled computer 12 operated by at least one student. The computers are connected by a communications network 19 including any one of, but not limited to, a combination of: a local area network (LAN), a wide area network (WAN), or the World Wide Web (WWW) which includes networking to cloud computing 16. The pen-enabled computers 10 and 12 may be located in one classroom or in remote locations for remote tutoring and learning. As is well known in the art, cloud computing 16 refers to the delivery of computing and storage capacity as a service to a heterogeneous community of end users. Its name comes from a cloud-shaped symbol which is often used to designate the complex infrastructure it contains in system diagrams such as FIG. 1. Also, shown in FIG. 1 is a computer readable storage medium 84. Its use, in combination with the other elements of the present invention, is described in more detail below.

Figure 2:
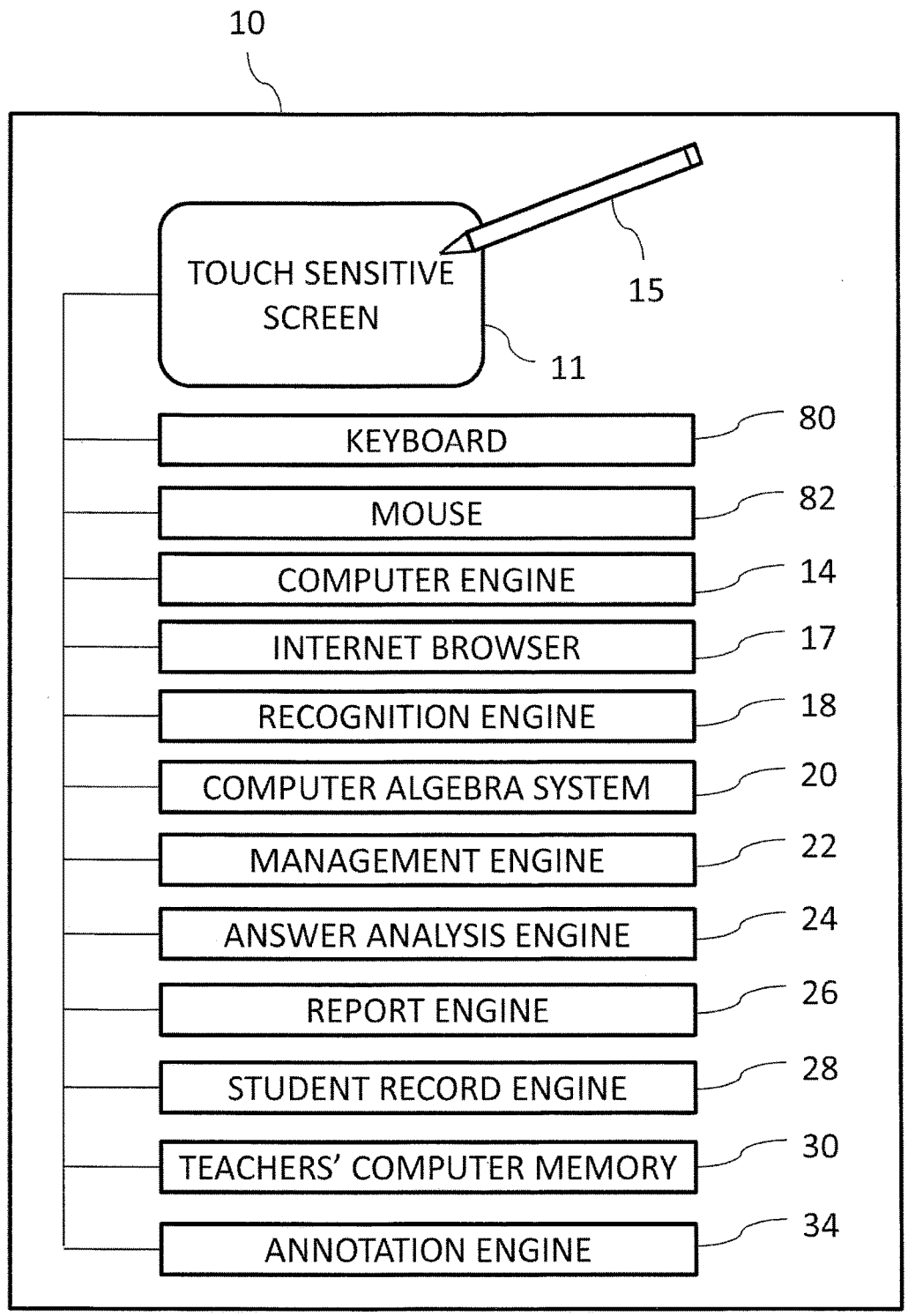
FIG. 2 is a block diagram of the teacher's computer forming part of the system of the present invention.

FIG. 2 is a block diagram of elements included in the pen-enabled computer 10 operated by the teacher. Pen-enabled computers are common in the industry and are commercially available from Hewlett Packard Company of Palo Alto, Calif., Fujitsu of Tokyo, Japan and Dell, Inc. of Round Rock, Tex., to name a few suppliers. These computers are equipped with a keyboard 80 and a mouse 82, a touch-sensitive graphical user interface (GUI), such as a touch sensitive screen 11, and a stylus 15 to provide input from a user. Computers such as these have a built-in computer engine 14 and a computer memory 30 for storing information. There are also commercially available tablet pen-enabled computers which do not have an integral keyboard and mouse and rely solely on their touch sensitive screen for user input. These tablets may be purchased from Apple, Inc. of Cupertino, Calif. (e.g., the iPhone™ device or the iPad™ device) and Dell, Inc. of Round Rock, Tex. (e.g., the various Android™ models), two of many suppliers. This type of tablet is less expensive than the computers mentioned above which have an integral keyboard and mouse. Tablet computers 10 and 12 are typically supplied with a web browser 17. Web browsers are built to well-known industry standards, and the functionality of the computers in which they are installed, as will be described below, may be augmented by cloud computing 16 via their internet browsers 17.

A software platform comprising a recognition engine 18 and a Computer Algebra System (CAS) 20 is installed in the pen-enabled computer 10 operated by the teacher. Software platforms such as these are commercially available, e.g., FluidMath™ provided by Fluidity Software, Inc., of Somerville, Mass. Either FluidMath™, or another similar software application, enables the user of a pen-enabled computer to create, solve, graph and animate math and science problems and sketches on the screen of their pen-enabled computer. The recognition engine 18 can read handwritten math formulae and sketches drawn on the screen of the computer, understand the formulae, associate the formulae with the sketches, and create solutions, graphs and dynamic animations.

The recognition engine 18 is also embodied in the student computer 12 and interprets the handwritten input on the screens of the students' tablets linked in the network and creates digitally enhanced versions of not only handwritten text input but also hand-drawn figures. Digital enhancement converts handwritten text to typeface text and hand-drawn sketches and diagrams to textbook-like figures. The enhancement process does not change the technical content of what is being enhanced. For example, handwritten text is displayed as printed typeface and hand-sketched figures are displayed as scale drawings with straight lines, perfect circles, and measured angles. The system of the present invention spontaneously generates the digitally enhanced versions and transmits them for display on each of the computers in the network.

The software platform also includes the general-purpose CAS 20. Mathematical computation, graphing and animation are accomplished with the user interfacing with the CAS 20 through handwritten input via the graphical user interface (GUI) screen 11 of the computer. As is known in the art, pen-enabled computers include features which are advantageous for the teaching and learning of STEM principles.

As shown in FIG. 2, the software of the present invention provides the teacher's tablet computer 10 with the following additional functionality included in the present invention: a network management engine 22, an answer analysis engine 24, a report engine 26, a student record engine 28, a teacher's computer memory 30 and an annotation engine 34. As described below, each of these engines cooperates with the other elements of the pen-enabled computer 10 operated by the teacher. The present invention enables spontaneous collaboration among the participants linked in the network 19.

The network management engine 22 enables the teacher to control and administer the computers 10 and 12 in the network 19 to perform the following functions:

a) Store example problems and solutions in the teacher's computer memory 30.

b) Store assessment quiz questions and their solutions in the teacher's computer memory 30.

c) Select and transmit stored material to the pen-enabled computers 12 operated by the students.

d) Transmit handwritten notation input into the pen-enabled computer 10 operated by the teacher to the pen-enabled computers 12 operated by the students.

e) Enable and disable functionality provided by the pen-enabled computers 12 operated by the students. During an assessment in accordance with the present invention, the teacher transmits over the network an instruction to the students' computers 12 to disable their problem solving capability so that the student solves the assessment, not his/her computer.

f) Store and evaluate the answers transmitted by the students from their computers 12 to the teacher's computer 10.

g) Provide collaborative math interactivity via handwritten math notation among participants linked by the network 19 as if writing on a whiteboard.

The annotation engine 34 enables any participant to annotate (add to, change, or delete, or interact mathematically with) the content of another participant's input by inputting their own computer with the annotation. The annotation is input and displayed on the computer of the participant making the change and is displayed on the respective computer of the participant whose input is being annotated as well as appearing simultaneously on all the computers linked in the network 19.

The annotation engine 34 enables the operator of any computer linked on the network 19 to transmit handwritten math notation instructing any other computer on the network 19 to perform a math calculation. For example, annotations input by a teacher can include math notation and geometric figures which interact mathematically with input displayed on a student computer and vice versa.

The answer analysis engine 24 provides the pen-enabled computer 10 operated by the teacher with the functionality to compare answers provided by the students to correct answers stored in the memory 30 of the teacher's computer 10 and/or generated by the CAS 20. The report engine 26 provides the computer 10 operated by the teacher with the functionality to present reports regarding the students' performance. The student record engine 28 provides the computer 10 operated by the teacher with the functionality to create individual student performance records for each student in the teacher's classes. The results of the assessments can be downloaded to a spreadsheet and stored therein.

Figure 3:
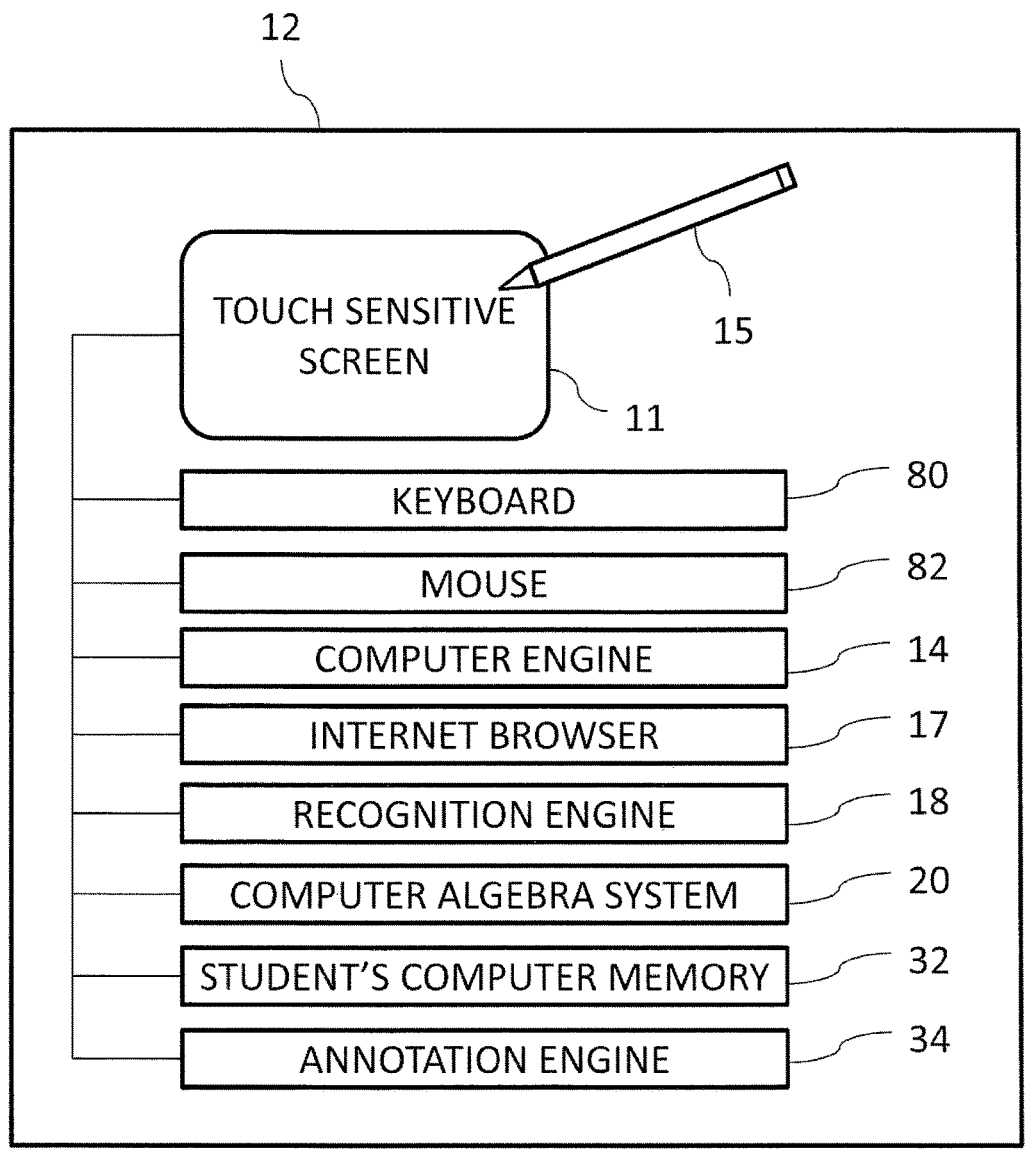
FIG. 3 is a block diagram of the student's computer forming part of the system of the present invention.

As shown in FIG. 3, the pen-enabled computer 12 operated by the student is a commercially available computer similar to the computer 10 (FIG. 2) operated by the teacher having the touch-sensitive screen 11 and the built-in computing engine 14. The student's computer 12 also includes the internet browser 17, the recognition engine 18, the CAS 20 and a student's computer memory 32. The functionality of the student's computer can be augmented by cloud computing 16. The functionalities of the elements in the student's computer 12 have been described above in the description of the teacher's computer 10 and, for the sake of brevity, are not repeated here.

The recognition engine 18, the CAS 20, and the answer analysis engine 24 enable the teacher to use the teachers' computer 10 to spontaneously create and solve example problems while teaching a lesson which can be transmitted to the students' computers 12 for presenting the problem. The teacher can also create pre-designed example problems while preparing for a lesson and store them in the teacher's computer 10 for retrieval when teaching a future lesson. In like manner, the teacher can also either spontaneously create assessment quiz problems in class or pre-design them for use in a future lesson. In each case, the teacher's computer stores the answers in STEM notation in the memory 30 of the teacher's computer 10. During an assessment process, the teacher can disable the problem solving functionality on the student's computer 12 to make sure the student is not using his/her computer to solve the problem.

The current explosive growth of tablet PCs with touch sensitive screens has led to a broad range of commercially available tablets along with a variety of operating systems provided in these tablets. Some of these operating systems may not support the software platform (the recognition engine 18 and the CAS 20) of the system of the present invention. However, most commercially available tablets are supplied with an internet browser 17 (FIG. 2). In the present invention, the cloud computer 16 has installed therein the software platform necessary to support the functionality of the present invention. The internet browser 17 communicates with the cloud computer 16 to access the internet platform stored therein, thereby providing the functionality required in the system and method of the present invention. Regardless of what operating system with which the tablet computer is supplied, as long as it has a web browser, it will be operable in accordance with the method and system of the present invention and as described herein. Accessing the cloud 16 and the calculations performed therein are entirely transparent to the users.

The logic and software for carrying out the functions of the teacher computer 10 and/or the student computers 12, and to create the various engines described above, may be embodied on the computer-readable storage medium 84, which is received by, interfaces with, or forms part of, the teacher computer 10 and/or the student computers 12. It should be understood that such computer-readable storage medium 84 includes, and may be realized as, a computer/compact disc (CD), a digital versatile/video disc (DVD), a read only memory (ROM), a programmable read only memory (PROM), an electrically erasable programmable read only memory (EEPROM), a random access memory (RAM) and like devices.

Although it is disclosed herein that the computer-readable storage medium 84 (FIG. 1) preferably resides on or is received by the at least one teacher computer 10, it is envisioned to be within the scope of the present invention to have the storage medium 84 residing on or being received by one or more student computers 12, or on the servers or computers which are associated with or perform the function of the cloud computing 16. Furthermore, one or more of the student computers 12 or the cloud computers or remote computers may be structured to include the same features and functionality of the teacher computer 10, including a keyboard 80, mouse 82, or a touch sensitive screen 11 and stylus 15, a management engine 22, an answer analysis engine 24, a report engine 26 and a student record engine 28, such that the functions of the teacher computer 10 may be performed by the one or more student computers 12, and any reports may be generated by the one or more student computers 12 and communicated to, and displayed on the display of, the teacher computer 10.

What follows are four examples of how the instant invention may be used by teachers and students to collaborate with each other via handwritten math notation and geometric figures to explore STEM principles. Teachers of STEM subjects are familiar with the lesson content typically employed to teach STEM principles through the use of example problems and therefore the details of such lessons are not included herein.

Rather, described below, by way of example, are the didactic features of the computerized system of the present invention embodied in the teacher's computer 10 and the student's computer 12 and how they enable handwritten collaboration.

A first example problem (FIG. 4) shown on the display of a student's computer relates to the teaching of basic algebra. In this first example, the teacher is presenting an algebra lesson covering the graphing of a straight line. The teacher is using a teacher's tablet PC 10 and the students are using student tablet PCs 12. The tablet PCs are of the type described above in FIG. 2 and FIG. 3 and are networked together as shown in FIG. 1.

In this example, at least one teacher and at least one student are not collocated. However, the present invention transforms each of their GUI screens to function as a virtual shared whiteboard which can be used by the teacher and the student simultaneously, as if they were next to each other. Furthermore, the present invention enables the virtual whiteboard to recognize and understand handwritten math notation. Whatever is input on the GUI 11 of the teacher's computer 10 is displayed and retained thereon and is simultaneously displayed and retained on the GUI 11 of the student's computer 12, and vice versa. The teacher and the student share written math notation via their respective GUI screens 11 as if they were standing side by side writing on an intelligent whiteboard located in front of them.

As noted above, the recognition engine 18 enables teachers and students to spontaneously create enhanced textbook grade illustrations of math problems without having to painstakingly draw them. The present invention spontaneously enhances each handwritten input and integrates the enhanced version into the system. Participants on the network can also be colleagues solving a STEM problem. The system of the present invention forms a common work page upon which participants collaborate using handwritten input. Their handwritten input is digitally enhanced for presentation on all the computers in the network. Also, as noted above, the system of the present invention enables a teacher to disable the problem solving functionality of the students' computers 12. During an assessment, their problem solving capabilities are disabled to ensure that the students' answers have not been automatically generated by their respective tablet computers 12.

Figure 4:
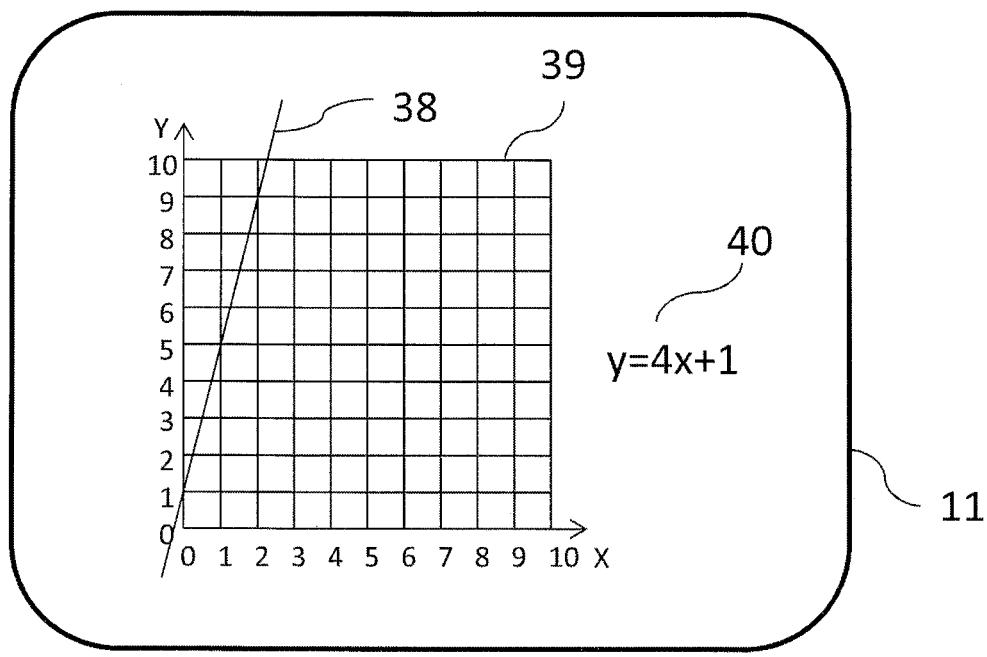
FIG. 4 is a simplified pictorial illustration of the graphical user interface (GUI) display of a student's computer of the system of the present invention showing a graph and an equation to illustrate a first example of a teacher-student collaboration in accordance with the method of the present invention.

In FIG. 4, the teacher presents the concept of an equation representing a first straight line 38. The graph of the line 38 can either be spontaneously drawn on the screen 11 of the teacher's computer 10 by the teacher or retrieved by the teacher from the memory 30 in the teacher's computer 10 as an example having been previously stored therein by the teacher. In FIG. 4, the teacher has retrieved the first example, including a set of Cartesian coordinates 39, from the teacher's computer memory 30. The example is transmitted by the teacher's computer 10 for presentation on the student computers 12. An equation, $y=4x+1$, reference No. 40, of the first straight line 38, is presented as part of the lesson. The teacher may use other examples and diagrams to define the line 38. Whatever examples the teacher selects, the pen-centric presentation process of the present invention is easy to use and does not interrupt the teaching flow in the class.

Figure 11:
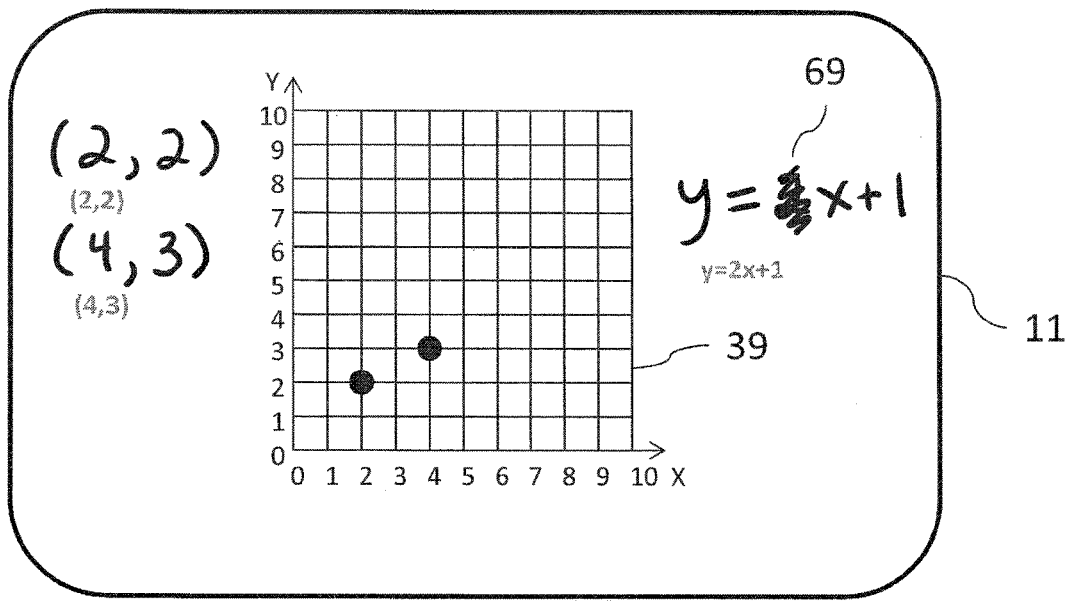
FIG. 11 is a simplified pictorial illustration of a GUI display showing the fourth step of the teacher-student collaboration in the exploration of the third example wherein the teacher erases an incorrect coefficient in the incorrect answer.

The annotation engine 34 of the present invention enables each participant to interact mathematically to modify the equation 40 and thereby change the characteristics of the graph displayed on each computer in the network 19. For example, any student can change the equation, $y=4x+1$, reference No. 40, displayed on his/her computer 12 to $y=2x+1$ and thereby change the slope of the line 38. As shown in FIGS. 11 and 16, changes are made by using either the stylus 15 (FIG. 1) or a fingertip to input a scribble gesture 69 to erase and change an inked input. Student interactive collaboration enables teachers to engage students, monitor their online responses and compare their learning progress to what the teacher expected in his/her lesson plan.

Figure 5:
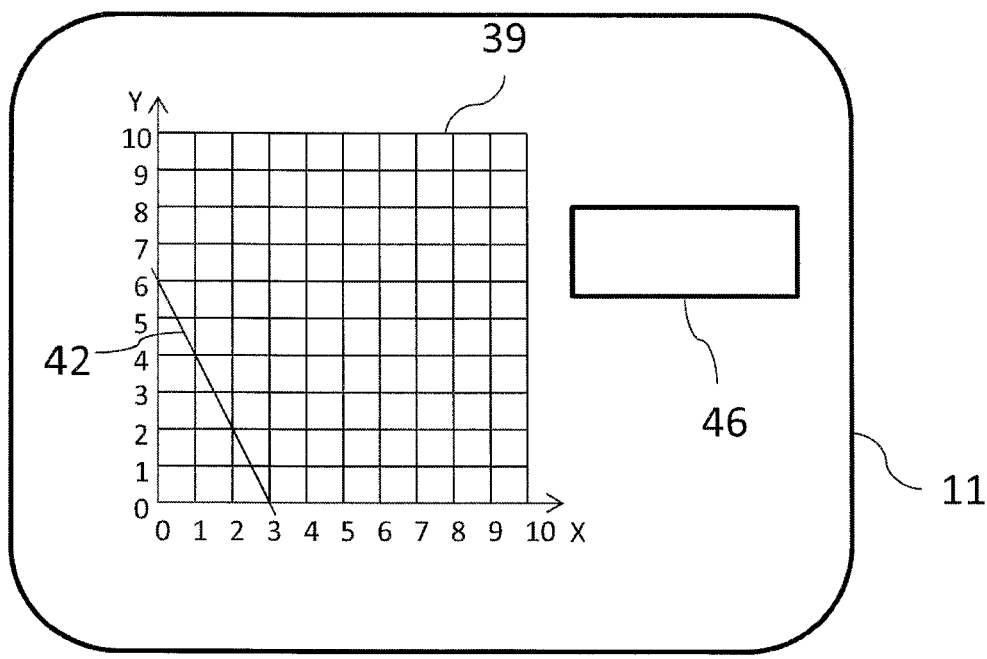
FIG. 5 is a simplified pictorial illustration of the GUI display of a student's computer of the system of the present invention showing a second example of a teacher-student collaboration using the method of the present invention.

At any time during the lesson, by employing the system and method of the present invention, the teacher can collaborate with the students in his/her class to evaluate whether the students are mastering the principles as they are being taught. The teacher assesses all of the students by presenting to the class a second example problem, a graph of a second straight line 42, as shown in FIG. 5. As noted above, the quiz problem can either be spontaneously drawn on the display screen 11 of the teacher's computer 10 by the teacher or accessed from its memory 30, by the teacher and presented on the student's computer 12. The assessment process does not interrupt the flow of teaching. The assessment presented on the student's computer 12 has an empty answer box 46 in which the teacher asks the students to write, in mathematical notation, the equation of the line 42 as show in FIG. 5.

Figure 6:
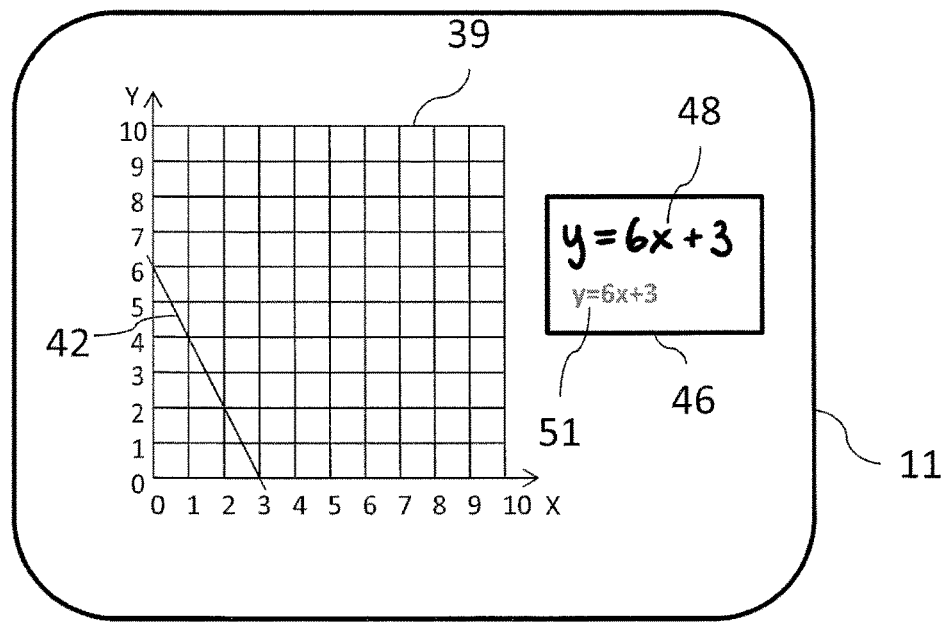
FIG. 6 is a simplified pictorial illustration of the GUI display of a student's computer of the system of the present invention illustrating a student's entry of an incorrect answer to the problem presented in FIG. 5.

Each student responds to the question by entering a handwritten answer, defined by math notation, in the answer box 46 displayed on their respective computers 12. The present invention enables the teacher to scroll through the answers and pick a response which he or she believes is appropriate to be the basis for a collaborative discussion aimed at exploring the math concept embodied in the assessment in order to correct students' misconceptions. The selected response is shown in FIG. 6 and includes, for the purposes of this example, an incorrect answer, $y=6x+3$, reference No. 48, handwritten by a student in the answer box 46 on his or her respective student's computer 12. Also, shown in the answer box 46 is a typeface version 51 of the handwritten input 48 indicating that the computer 12 upon which it is entered has received and understood the handwritten input. In the figures which follow, for the sake of brevity, the typeface versions do not include a reference number and their purpose is not described again. In FIG. 6, the student's answer includes an incorrect slope, 6, rather than the correct slope, $-2$.

Figure 7:
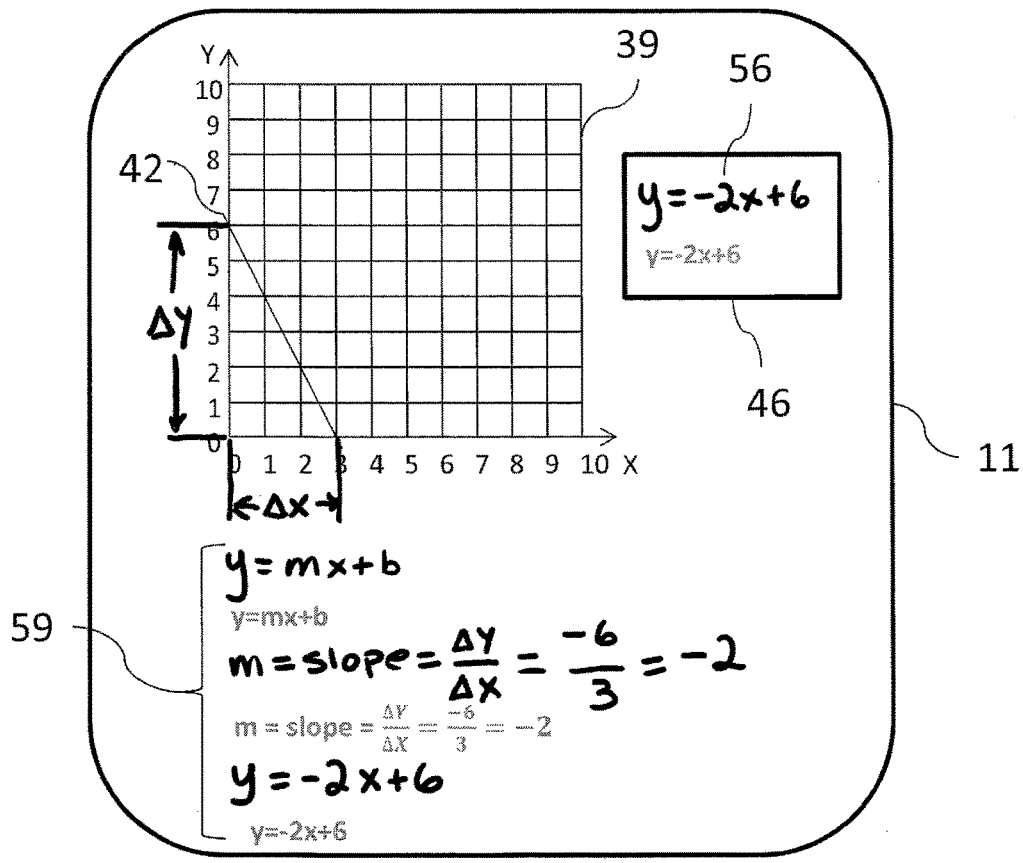
FIG. 7 is a simplified pictorial illustration of the GUI display of a student's computer of the system of the present invention showing a teacher's annotations to the correct answer to the problem presented in FIG. 5.

FIG. 7 illustrates the teacher's response to the student's incorrect answer. The teacher's response includes the following handwritten annotations, reference No. 59:

a) Dimensions labeled $\Delta Y$ and $\Delta X$ defining the slope of the line 42.

b) A correct answer 56 in the answer box 46.

c) Annotations defining the concept of slope embodied in the example.

The hand drawn dimensions labeled $\Delta Y$ and $\Delta X$ on the graph define the coordinate dimensions which determine the slope of the line 42. The correct answer, $y=-2x+6$, reference No. 56, includes the correct slope, $-2$, of the equation entered in the answer box 46. Annotations written below the graph define aspects of the graph which the teacher has entered as part of the collaboration to correct students' misconceptions.

Figure 8:
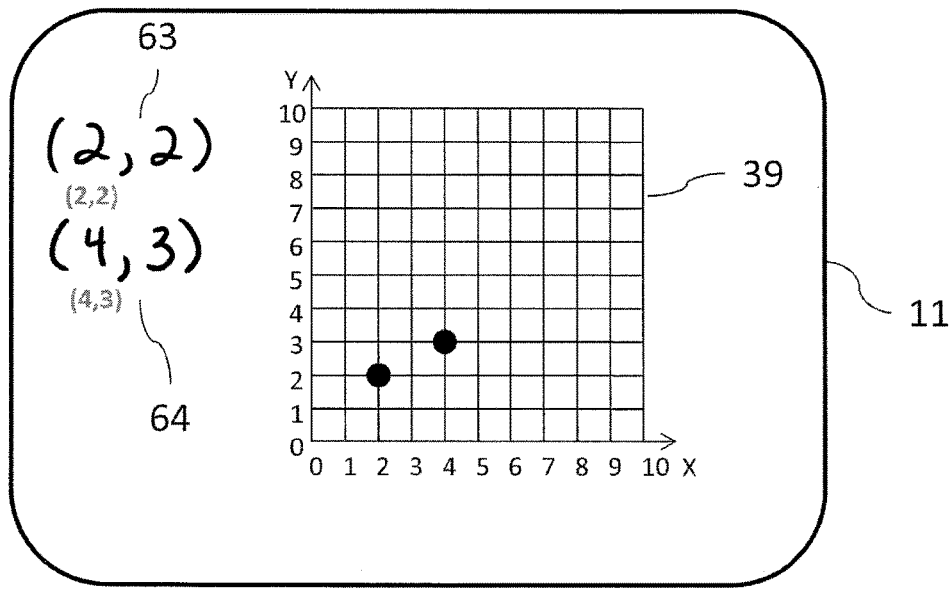
FIG. 8 is a simplified pictorial illustration of a GUI display of a teacher's computer of the system of the present invention showing the first step of a step by step teacher-student collaboration in the exploration of a third example wherein the teacher and students collaborate to plot a line which passes through two points on Cartesian coordinates.

FIG. 8 is a simplified pictorial illustration of the GUI 11 of a teacher's computer 10 displaying the teacher's input in Step 1 of a teacher-student step by step collaboration to create the equation of a straight line passing through the points (2,2), reference No. 63, and (4,3), reference No. 64, in a third example problem.

In Step 1, the teacher retrieves from his/her computer memory 30 a set of Cartesian coordinates 39 and plots the two points (2,2) and (4,3) thereon. The GUIs 11 of each step in the example are displayed on all the GUIs 11 linked by the network 19.

Figure 9:
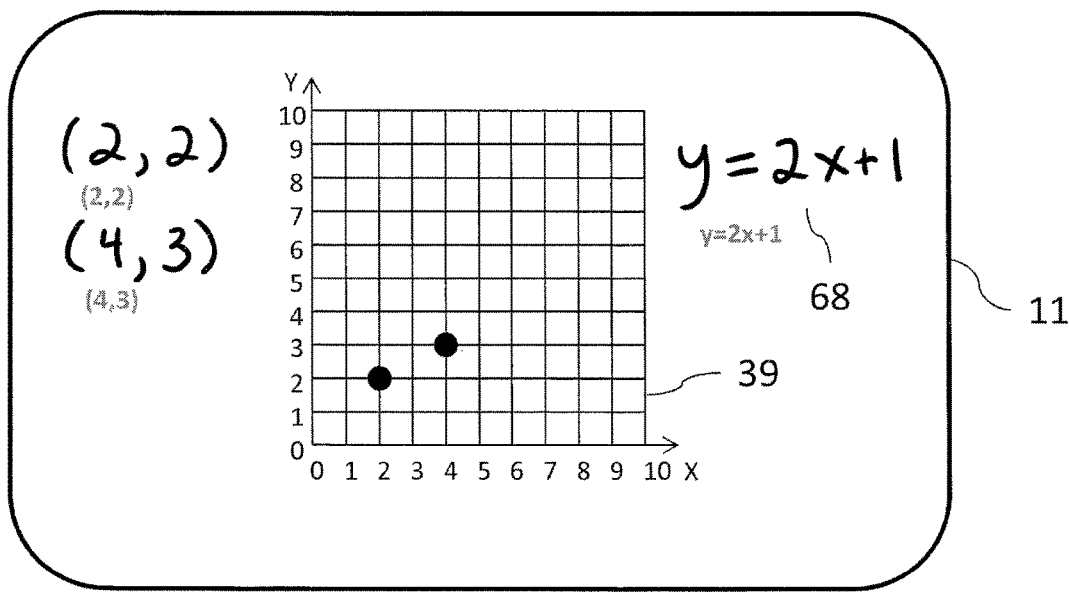
FIG. 9 is a simplified pictorial illustration of a GUI display showing the second step of the teacher-student collaboration in the exploration of the third example wherein the student enters an incorrect equation in answer to the problem presented in FIG. 8.

FIG. 9 is a simplified pictorial illustration of Step 2 in the collaboration. In Step 2, the teacher asks the student to write the equation of the line passing through the points (2,2) and (4,3). In response, the student writes an incorrect answer, $y=2x+1$, reference No. 68, in the answer box 46.

Figure 10:
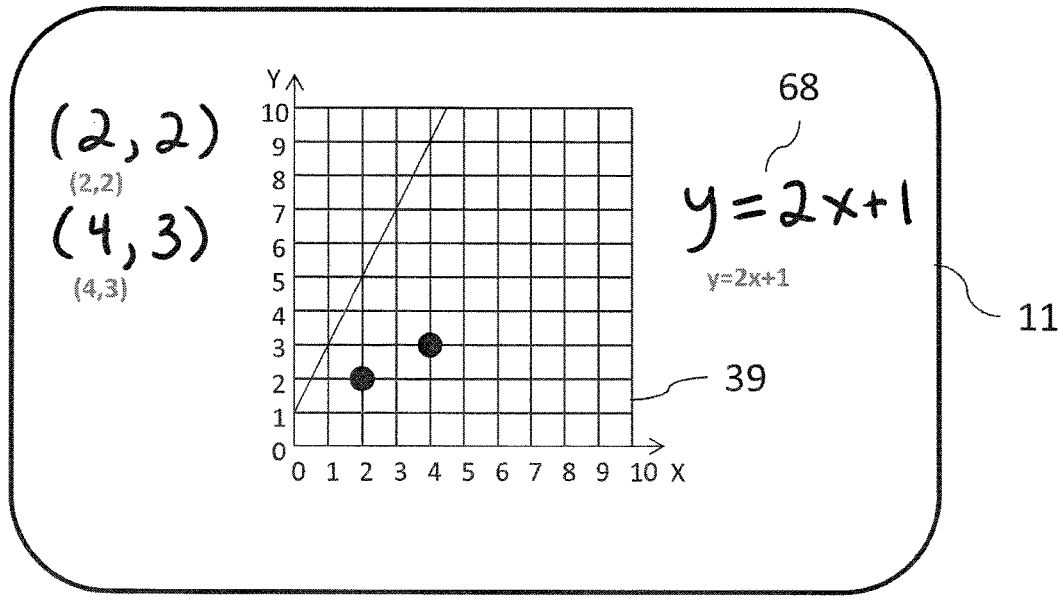
FIG. 10 is a simplified pictorial illustration of a GUI display showing the third step of the teacher-student collaboration in the exploration of the third example wherein the incorrect answer is plotted on the Cartesian coordinates.

FIG. 10 shows Step 3 of the collaboration wherein the teacher asks the student to prompt his/her computer 12 to produce a computerized plot of the line whose equation was entered in Step 2. The line is observed not to pass through (2,2) and (4,3).

FIG. 11 shows Step 4 of the collaboration wherein the teacher indicates that the equation, $y=2x+1$, includes an incorrect slope. The teacher erases the number 2 in the equation by contacting his or her screen 11 with a stylus 15 or fingertip and by making a scribble 69 on the number 2, thereby erasing it as shown in FIG. 12.

Figure 12:
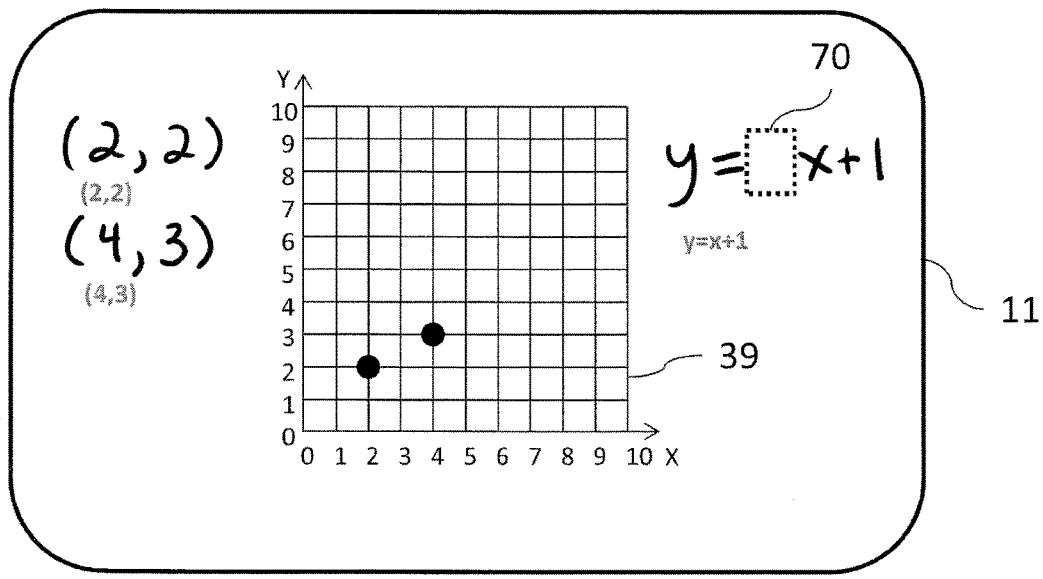
FIG. 12 is a simplified pictorial illustration of a GUI display showing the fifth step of the teacher-student collaboration in the exploration of the third example wherein the student is presented with an equation in which to insert the correct coefficient.

FIG. 12 shows Step 5 of the collaboration wherein the number 2 has been erased from the equation leaving a first space 70.

Figure 13:
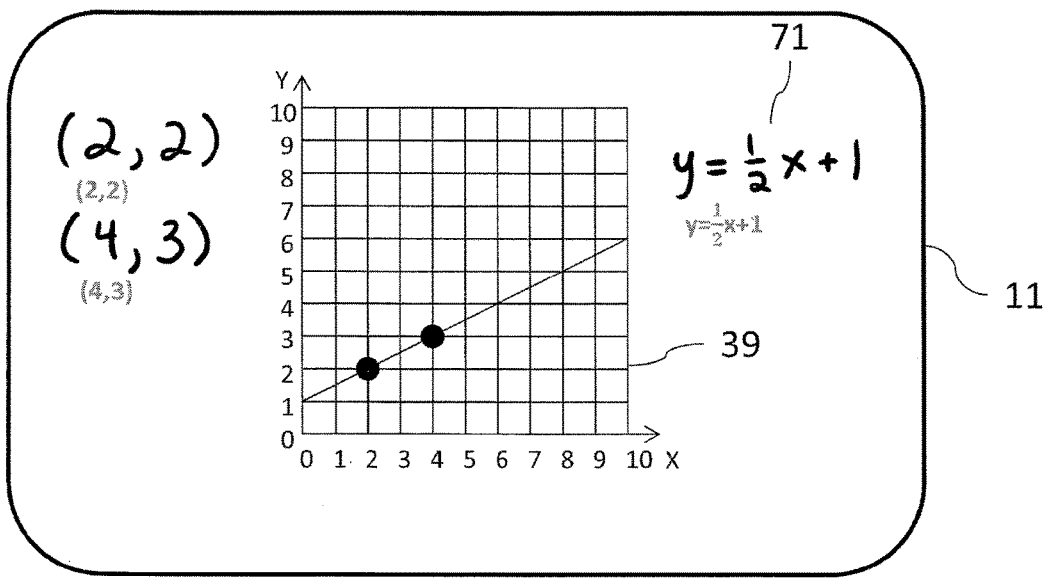
FIG. 13 is a simplified pictorial illustration of a GUI display showing the sixth step of the teacher-student collaboration in the exploration of the third example wherein the student completes the correction of the equation of FIG. 10.

FIG. 13 shows Step 6 wherein the student corrects the slope by entering the correct slope, ½, in the equation and verifies its correctness by having his/her computer plot the line represented by the equation $y=\frac{1}{2}x+1$, reference No. 71.

FIG. 14 is a simplified pictorial illustration of the GUI 11 of a teacher's computer 10 displaying the teacher's input in Step 1 of a teacher-student step by step collaboration in solving a fourth example problem which relates to the distributive principle in Algebra. In Step 1, the teacher asks his/her students to solve the equation $2(x-3)=4$, reference No. 72, displayed in FIG. 14 using the distributive principle.

In this example, the teacher and the student are not collocated. However, the present invention transforms each of their GUI screens 11 into a virtual shared whiteboard which can be used by the teacher and the student simultaneously. Furthermore, the present invention enables the virtual whiteboard to recognize and understand handwritten math notation. Whatever is input on the GUI 11 of the teacher's computer 10 is displayed and retained thereon and is simultaneously displayed and retained on the GUI 11 of the student computers 12, and vice versa. The teacher and the students share written math notation via their respective GUI screens 11 as if they were standing side by side writing on an intelligent whiteboard located in front of them.

FIG. 15 is a simplified pictorial illustration of Step 2 of the collaboration. In Step 2, the teacher asks a student to rearrange the equation presented in Step 1 using the distributive principle of Algebra. The student writes an incorrect equation, $2x-3=4$, reference number 73, on the GUI screen 11 of his/her computer 12.

FIG. 16 is a simplified pictorial illustration of Step 3 of the collaboration. In Step 3, since the teacher and student are sharing the same collaborative whiteboard, the teacher sees on his/her screen 11 what the student wrote. The teacher can now explain to the student that a mistake was made and that he/she can help fix the mistake. The teacher uses a scribble erase gesture 74 to erase the 3 as shown in FIG. 16.

FIG. 17 is a simplified pictorial illustration of Step 4 of the collaboration wherein the number 3 has been erased leaving a second space 75.

FIG. 18 is a simplified pictorial illustration of the correct answer, $2x-6=4$, reference number 76, created by the student.

FIG. 19 illustrates the solution to the problem in FIG. 14, the solution being input by the student.

The examples described herein relate to collaborations between teachers and students in educational settings. It is to be understood that the present invention can be used in a broad range of environments wherein participants use tablet computers such as the tablet computers 10 and 12 shown in FIG. 1 to collaborate in the solution of STEM problems and the exchange of STEM reference data either spontaneously handwritten in math notation on the screens of their computers 10, 12 or stored in their respective computers' memories 30, 32.

Unlike the prior art, the present invention enables participants to interact via handwritten math notation as if they were writing on the same virtual whiteboard upon which each participant's handwritten math notation is understood and mathematically interacts with other participants' handwritten math notation.

Although a teacher computer 10 and a student computer 12, and teachers and students, are disclosed herein, it should be understood that the computerized system of the present invention is usable by persons other than teachers and students. More specifically, the system could include just student computers 12 operable by students, just teacher computers 10 operable by teachers, multiple teacher computers 10 and multiple student computers 12, all of which are connected via the communications network 19, and non-teacher and non-student computers, for example, the non-teacher computers and non-student computers being operable by engineers collaborating on solving a STEM problem.

Certain features of the computerized system of the present invention will now be described.

A computerized system enabling at least a first person (such as a teacher or several teachers, or engineers, for example) and at least a second person (such as a student or several students, or engineers, for example) to collaborate in the solutions of STEM (science, technology, engineering and mathematics) problems includes a communications network 19, at least a first computer 10 operable by the at least first person, at least a second computer 12 operable by the at least second person, the at least second computer 12 being operably connected to the at least first computer 10 via the communications network 19, and at least one computer-readable storage medium 84 operably connected to the communications network 19.

Each of the at least first computer 10 and the at least second computer 12 includes an input device 15, 80, 82 and a touch sensitive screen 11 for receiving handwritten input via the input device 15, 80, 82. The at least first computer 10 and the at least second computer 12 are operably connected to the at least one computer-readable storage medium 84. The at least one computer-readable storage medium 84 contains program instructions transforming each touch sensitive screen 11 of the at least first computer 10 and the at least second computer 12 operably connected via the communications network 19 into a virtual shared whiteboard defining a common work page upon which handwritten input from each of the at least first computer 10 and the at least second computer 12 is received and displayed.

The computerized system causes handwritten input received from the at least first computer 10 to interact mathematically with handwritten input received from the at least second computer 12 operably connected together via the communications network 19 to generate computer interactions. The computer interactions are displayed on the touch sensitive screen 11 of the at least first computer 10 and the at least second computer 12. The handwritten inputs and computer interactions result in a collaborative solution to a STEM problem.

In another form of the present invention, a computerized system enabling at least a first person, such as described above, and at least a second person, such as described above, to collaborate in the solutions of STEM (science, technology, engineering and mathematics) problems includes a communications network 19, at least a first computer 10 operable by the at least first person, at least a second computer 12 operable by the at least second person, the at least second computer 12 being operably connected to the at least first computer 10 via the communications network 19, and at least one computer-readable storage medium 84 operably connected to the communications network 19.

Each of the at least first computer 10 and the at least second computer 12 includes an input device 15, 80, 82 and a touch sensitive screen 11 for receiving handwritten input via the input device 15, 80, 82.

The at least first computer 10 and the at least second computer 12 are operably connected to the at least one computer-readable storage medium 84. The at least one computer-readable storage medium 84 contains program instructions for performing several steps. The steps include: (a) receiving at least one math question handwritten by the at least first person in math notation on the touch sensitive screen 11 of the at least first computer 10 to provide a received handwritten input in math notation; (b) displaying the received handwritten input of step (a) on the touch sensitive screen 11 of the at least first computer 10 and the at least second computer 12; (c) receiving at least one handwritten response from the at least second computer 12 via the communications network 19 to provide a received handwritten response, the at least one response being input by the at least second person by handwriting the at least one response in math notation on the touch sensitive screen 11 of the at least second computer 12; (d) displaying the received handwritten response of step (c) on the touch sensitive screen 11 of the at least first computer 10 and the at least second computer 12; (e) causing by the system the received handwritten response in math notation from the at least second computer 12 to interact with the received handwritten input in math notation from the at least first computer 10 and thereby generating a computer interaction, the computer interaction being displayed on the touch sensitive screen 11 of the at least first computer 10 and the at least second computer 12; (f) comparing the computer interaction with a correct answer to the at least one math question; and (g) repeating steps (c) through (f) until the computer interaction equates to the correct answer.

In another form of the present invention, a computerized system enabling at least a first person, such as described previously, and at least a second person, such as described previously, to collaborate in the solutions of STEM (science, technology, engineering and mathematics) problems includes a communications network 19, at least a first computer 10 operable by the at least first person, at least a second computer 12 operable by the at least second person, and at least one computer-readable storage medium 84.

Each of the at least first computer 10 and the at least second computer 12 includes an input device 15, 80, 82 and a display screen 11. The at least second computer 12 is operably linked to the at least first computer 10 via the communications network 19.

The at least first computer 10 and the at least second computer 12 are operably linked to the at least one computer-readable storage medium 84. The at least one computer-readable storage medium 84 contains program instructions for implementing an application of the system that includes one or more program instructions for performing several steps. The steps include: (a) entering at least one math question description in math notation and at least one correct answer to the at least one math question description into at least one of the at least first computer 10 and the at least second computer 12; (b) storing the at least one correct answer to the at least one math question description in the at least one computer-readable storage medium 84; (c) displaying the at least one math question description entered in step (a) on the display screen 11 of the at least first computer

10 and the at least second computer 12; (d) entering at least one math expression response in response to the at least one math question description entered in step (a) on at least one of the at least first computer 10 and the at least second computer 12; (e) displaying the at least one math expression response entered in step (d) on the display screen 11 of at least one of the at least first computer 10 and the at least second computer 12; (f) causing by the system the at least one math expression response to interact mathematically with the at least one math question description in math notation of step (a) and thereby producing a math expression result; (g) comparing the math expression result of step (f) to the at least one correct answer stored in the at least one computer-readable storage medium 84; and (h) repeating steps (d) through (g) until the math expression result equates to the correct answer.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A computerized system enabling teachers and students to collaborate in the solutions of STEM (science, technology, engineering and mathematics) problems, the system comprising:
    a communications network;
    at least one teacher computer operable by a respective teacher;
    at least one student computer operable by a respective student, the at least one student computer being operably connected to the at least one teacher computer via the communications network; and
    at least one computer-readable storage medium operably connected to the communications network;
    wherein each of the at least one teacher computer and the at least one student computer includes an input device and a touch sensitive screen for receiving handwritten math notation input via the input device;
    wherein the at least one teacher computer and the at least one student computer are operably connected to the at least one computer-readable storage medium, the at least one computer-readable storage medium containing program instructions transforming each touch sensitive screen of the at least one teacher computer and the at least one student computer operably connected via the communications network into a virtual shared whiteboard defining a common work page upon which handwritten math notation input from each of the at least one teacher computer and the at least one student computer is received and displayed;
    wherein the system reads and understands the handwritten math notation input;
    wherein the system, when prompted in real-time by at least one of the respective teacher or the respective student, causes the system to spontaneously generate illustrations representing the respective teacher's or the respective student's handwritten math notation input;
    wherein the system enables collaboration between the respective teacher and the respective student both inputting handwritten math notation to create a solution to the STEM problem by annotating each other's input including the illustrations spontaneously generated by at least one of the respective teacher or the respective student and displayed on the common work page; and
    wherein the handwritten math notation inputs result in a collaborative solution to a STEM problem.

2. The system according to claim 1, wherein the communications network includes cloud computing to provide additional computing capacity for the computer-readable storage medium.

3. The system according to claim 1, wherein the at least one teacher computer and the at least one student computer are respectively operable by users other than the respective teacher and the respective student.

4. The system according to claim 1, wherein the input device is a stylus.

5. The system according to claim 1, wherein the input device is a user's fingertip performing the function of a stylus.

6. The system according to claim 1 wherein the input is handwritten text.

7. The system according to claim 1, wherein the input is a sketched math diagram.

8. The system according to claim 1, wherein the input is digitally enhanced.

9. The system according to claim 1, wherein the input entered on the at least one teacher computer includes at least one math question description.

10. The system according to claim 9, wherein the at least one math question description is input into the at least one teacher computer prior to the collaboration of the respective teacher and the respective student.

11. The system according to claim 9, wherein the at least one math question description is input into the at least one teacher computer during the collaboration of the respective teacher and the respective student.

12. The system according to claim 9 wherein the handwritten math notation input received from the at least one student computer is an answer to the at least one math question description.

13. The system according to claim 9, which further comprises a Computer Algebra System (CAS), and wherein the computer-readable storage medium is operably connected to the CAS, the CAS providing a correct answer to the at least one math question description.

14. The system according to claim 13, wherein at least one handwritten math notation input received by the at least one student computer is evaluated by the system for correctness by comparing the at least one handwritten math notation input received by the at least one student computer to the correct answer.

15. The system according to claim 1, wherein portions of the displayed handwritten math notation inputs can be erased from the touch sensitive screen of at least one of the at least one teacher computer and the at least one student computer by a scribble gesture of the input device of the at least one teacher computer and the at least one student computer.

16. The system according to claim 1, wherein the system is used to administer routine tests, homework assignments and achievement tests.

17. The system according to claim 1, wherein the at least one student computer has problem solving capability; and wherein the problem solving capability of the at least one student computer can be disabled.

18. The system according to claim 1, wherein the at least one teacher computer and the at least one student computer are remotely situated in separate locations.

19. A computerized teaching system providing a teaching tool for presenting and teaching collaborative solutions to STEM (science, technology, engineering and mathematics) questions, the system comprising:

a communications network;

at least one teacher computer operable by a respective teacher;

at least one student computer operable by a respective student, the at least one student computer being operably connected to the at least one teacher computer via the communications network; and at least one computer-readable storage medium operably connected to the communications network;

wherein each of the at least one teacher computer and the at least one student computer includes an input device and a touch sensitive screen for receiving handwritten math notation input via the input device; and wherein the at least one teacher computer and the at least one student computer are operably connected to the at least one computer-readable storage medium, the at least one computer-readable storage medium containing program instructions for performing the steps of:

(a) receiving at least one math question handwritten by the teacher in math notation on the touch sensitive screen of the at least one teacher computer to provide a received handwritten input in math notation;

(b) displaying the received handwritten input of step (a) on the touch sensitive screen of the at least one teacher computer and the at least one student computer;

(c) receiving at least one handwritten student response from the at least one student computer via the communications network to provide a received handwritten student response, the at least one student response being input by the student by handwriting the at least one student response in math notation on the touch sensitive screen of the at least one student computer;

(d) displaying the received handwritten student response of step (c) on the touch sensitive screen of the at least one teacher computer and the at least one student computer;

(e) enabling the system to read and understand the handwritten math notation received by the respective teacher and to read and understand the handwritten math notation received by the at least one student causing the system, when prompted by either the respective teacher or the at least one student, to spontaneously generate mathematical illustrations representing the handwritten math notation received by the system thereby enabling the respective teacher and the at least one student to collaborate using handwritten math notation on the at least one teacher computer and the at least one student computer to create a collaborative solution to the at least one math question, the collaborative solution to the at least one math question being displayed on the screen of the at least one teacher computer and the at least one student computer;

(f) comparing the collaborative solution of step (e) with a correct answer to the at least one math question; and (g) repeating steps (c) through (f) until the collaborative solution equates to the correct answer.

20. A computerized teaching system enabling teachers and students to collaborate in solving STEM (science, technology, engineering and mathematics) problems, the system comprising:

a communications network;

at least one teacher computer operable by a respective teacher;

at least one student computer operable by a respective student; and at least one computer-readable storage medium;

wherein each of the at least one teacher computer and the at least one student computer includes an input device and a display screen;

wherein the at least one student computer is operably linked to the at least one teacher computer via the communications network;

wherein the at least one teacher computer and the at least one student computer are operably linked to the at least one computer-readable storage medium, the at least one computer-readable storage medium containing program instructions for implementing an application of the teaching system comprising one or more program instructions for performing the steps of:

(a) entering at least one math question description in math notation and at least one correct answer to the at least one math question description into at least one of the at least one teacher computer and the at least one student computer;

(b) storing the at least one correct answer to the at least one math question description in the at least one computer-readable storage medium;

(c) displaying the at least one math question description entered in step (a) on the display screen of the at least one teacher computer and the at least one student computer;

(d) entering at least one math expression response in response to the at least one math question description entered in step (a) on at least one of the at least one teacher computer and the at least one student computer;

(e) displaying the at least one math expression response entered in step (d) on the display screen of the at least one teacher computer and the at least one student computer;

(f) enabling the at least one teacher computer and the at least one student computer to read and understand the handwritten math notation entered therein by the respective teacher and the at least one student in steps (a) and (d) thereby producing a math expression result and causing the system, when prompted by either the respective teacher or the at least one student, to spontaneously generate mathematical illustrations representing the handwritten math notation received by the system;

(g) comparing the math expression result of step (d) to the at least one correct answer stored in the at least one computer-readable storage medium; and (h) repeating steps (d) through (g) until the math expression result equates to the correct answer.

21. The system according to claim 20, wherein the input device of the at least one teacher computer includes at least one of a keyboard and a mouse and the at least one math question description is received by the at least one teacher computer by the teacher entering the at least one math question description by using the at least one of the keyboard and the mouse.

22. The system according to claim 20, wherein the input device of the at least one teacher computer includes at least one of a keyboard and a mouse and the at least one correct answer corresponding to the at least one math question description is received by the at least one teacher computer by the teacher entering the at least one correct answer by using the at least one of the keyboard and the mouse.

23. The system according to claim 20, wherein the input device of the at least one student computer includes at least one of a keyboard and a mouse and the at least one math expression response corresponding to the at least one math question description is received by the at least one student computer by the student entering the at least one math expression response by using the at least one of the keyboard and the mouse.

24. A computerized system enabling at least a first person and at least a second person to collaborate in the solutions of STEM (science, technology, engineering and mathematics) problems, the system comprising:
   a communications network;
   at least a first computer operable by the at least first person;
   at least a second computer operable by the at least second person, the at least second computer being operably connected to the at least first computer via the communications network; and
   at least one computer-readable storage medium operably connected to the communications network;
   wherein each of the at least first computer and the at least second computer includes an input device and a touch sensitive screen for receiving handwritten math notation input via the input device;
   wherein the at least first computer and the at least second computer are operably connected to the at least one computer-readable storage medium, the at least one computer-readable storage medium containing program instructions transforming each touch sensitive screen of the at least first computer and the at least second computer operably connected via the communications network into a virtual shared whiteboard defining a common work page upon which handwritten input from each of the at least first computer and the at least second computer is received and displayed;
   wherein the computer readable storage medium enables the system to read and understand the handwritten math notation input on the common work page and, when prompted, to spontaneously generate illustrations associated with the handwritten math notation input;
   wherein the at least first person and the at least second person collaborate to solve the STEM problem via their handwritten math notation entered and displayed on the common work page; and
   wherein the handwritten math notation input and the associated illustrations result in a collaborative solution to the STEM problem.

25. A computerized system enabling at least a first person and at least a second person to collaborate in the solutions of STEM (science, technology, engineering and mathematics) problems, the system comprising:
   a communications network;
   at least a first computer operable by the at least first person;
   at least a second computer operable by the at least second person, the at least second computer being operably connected to the at least first computer via the communications network; and
   at least one computer-readable storage medium operably connected to the communications network;
   wherein each of the at least first computer and the at least second computer includes an input device and a touch sensitive screen for receiving handwritten input via the input device; and
   wherein the at least first computer and the at least second computer are operably connected to the at least one computer-readable storage medium, the at least one computer-readable storage medium containing program instructions for performing the steps of:

(a) receiving at least one math question handwritten by the at least first person in math notation on the touch sensitive screen of the at least first computer to provide a received handwritten input in math notation;
(b) displaying the received handwritten input of step (a) on the touch sensitive screen of the at least first computer and the at least second computer;
(c) receiving at least one handwritten response from the at least second computer via the communications network to provide a received handwritten response, the at least one response being input by the at least second person by handwriting the at least one response in math notation on the touch sensitive screen of the at least second computer;
(d) displaying the received handwritten response of step (c) on the touch sensitive screen of the at least first computer and the at least second computer;
(e) enabling the system to conduct a collaboration between the at least first person and the at least second person to solve the at least one math question, the at least first person and the at least second person entering handwritten math notation inputs on the at least first computer and the at least second computer causing the system to spontaneously generate illustrations representing the math notation input, the math notation input and the associated spontaneously generated illustrations being displayed on the at least first computer and the at least second computer, the at least first person and the at least second person collaborating by annotating each other's handwritten math notation input to create a collaborative solution to the at least one math question;
(f) comparing the collaborative solution with a correct answer to the at least one math question; and
(g) repeating steps (c) through (f) until the collaborative solution equates to the correct answer.

26. A computerized system enabling at least a first person and at least a second person to collaborate in the solutions of STEM (science, technology, engineering and mathematics) problems, the system comprising:
   a communications network;
   at least a first computer operable by the at least first person;
   at least a second computer operable by the at least second person; and
   at least one computer-readable storage medium;
   wherein each of the at least first computer and the at least second computer includes an input device and a display screen;
   wherein the at least second computer is operably linked to the at least first computer via the communications network; and
   wherein the at least first computer and the at least second computer are operably linked to the at least one computer-readable storage medium, the at least one computer-readable storage medium containing program instructions for implementing an application of the system comprising one or more program instructions for performing the steps of:
(a) entering at least one math question description in math notation and at least one correct answer to the at least one math question description into at least one of the at least first computer and the at least second computer;
(b) storing the at least one correct answer to the at least one math question description in the at least one computer-readable storage medium;

(c) displaying the at least one math question description entered in step (a) on the display screen of the at least first computer and the at least second computer;
(d) entering at least one math expression response in response to the at least one math question description entered in step (a) on at least one of the at least first computer and the at least second computer;
(e) displaying the at least one math expression response entered in step (d) on the display screen of the at least first computer and the at least second computer;
(f) enabling the system to support a collaboration between the at least first person and the at least second person to solve the at least one math question, the at least first person and the at least second person entering handwritten math notation into the at least first computer and the at least second computer, respectively, which is read and understood by the system and, when prompted, causes the system to spontaneously generate illustrations representing the math notation input, the math notation input and the associated illustrations being displayed on the at least first computer and the at least second computer, the at least first person and the at least second person collaborating by annotating each other's input into the at least first computer and the at least second computer via handwritten math notation thereby creating a math expression result to the at least one math question;
(g) comparing the math expression result of step (f) to the at least one correct answer stored in the at least one computer-readable storage medium; and
(h) repeating steps (d) through (g) until the math expression result equates to the correct answer.

* * * * *